(No Model.)

A. CALDWELL.
SOCKET TIP FOR FLEXIBLE TUBING.

No. 425,367. Patented Apr. 8, 1890.

Witnesses.
Chas. F. Schmelz.
John S. Lynch

Inventor:
Alfred Caldwell
per S. Schofield
Attorney

UNITED STATES PATENT OFFICE.

ALFRED CALDWELL, OF PROVIDENCE, RHODE ISLAND.

SOCKET-TIP FOR FLEXIBLE TUBING.

SPECIFICATION forming part of Letters Patent No. 425,367, dated April 8, 1890.

Application filed August 27, 1889. Serial No. 322,117. (No model.)

*To all whom it may concern:*

Be it known that I, ALFRED CALDWELL, a citizen of the United States, residing at Providence, in the State of Rhode Island, have invented a new and useful Improvement in Socket-Tips for Flexible Tubing, of which the following is a specification.

My invention consists of a socket-tip made of rubber in one piece, provided with hard and soft portions, as hereinafter set forth.

Figure 1:
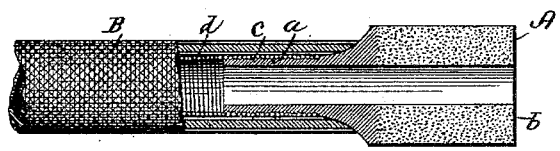
Figure 2:
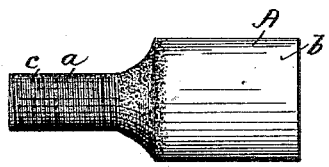

Figure 1 represents a longitudinal section of my improved socket-tip. Fig. 2 represents an exterior view of the same.

In the accompanying drawings, A is the socket-tip, which is made in one piece of rubber, the shank $a$ being vulcanized to a hard condition, while the socket portion $b$ is made soft and elastic, so as to fit upon connections of various sizes. The hard-rubber shank $a$ is preferably provided with a screw-thread $c$, which fits the convolutions of the wire spiral $d$, the said spiral forming the foundation of the flexible tube B, to which the tip is attached.

I claim as my invention—

As a new article of manufacture, a socket-tip for flexible tubing, made with hard and soft rubber in one piece, substantially as described.

ALFRED CALDWELL.

Witnesses:
SOCRATES SCHOLFIELD,
JOHN S. LYNCH.